May 5, 1931.  B. L. COCHRAN  1,804,089
TRAILER
Filed Dec. 8, 1928   2 Sheets-Sheet 2

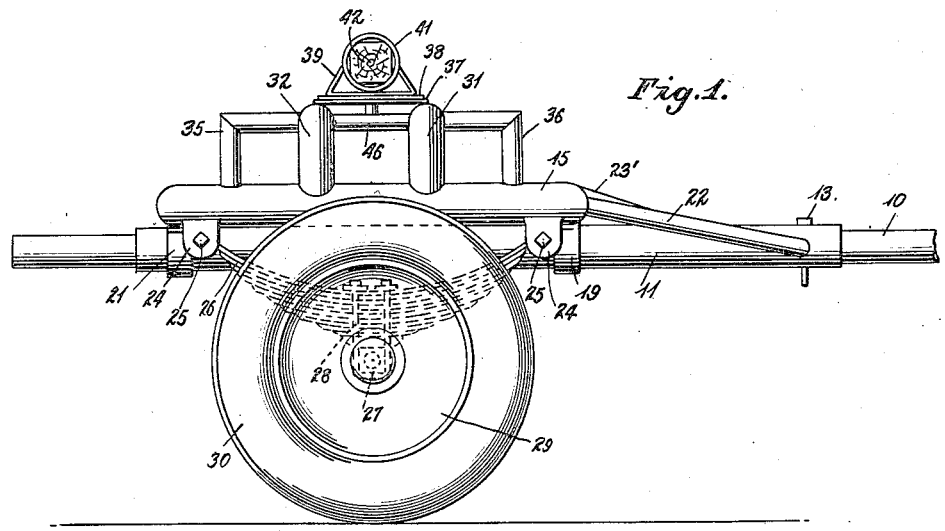

Inventor
B.L.Cochran
By Bacon & Thomas
Attorneys

Patented May 5, 1931

1,804,089

UNITED STATES PATENT OFFICE

BEN. L. COCHRAN, OF DUNCAN, OKLAHOMA, ASSIGNOR TO MAGNOLIA PETROLEUM COMPANY, OF DALLAS, TEXAS, A CORPORATION OF TEXAS

TRAILER

Application filed December 8, 1928. Serial No. 324,717.

This invention relates to trailers for trucks or tractors, of the type adapted for hauling elongated articles which are longer than the wheel base of the tractive vehicle, such as pipes, poles and the like, and more particularly to an improved frame construction for trailers of this character.

The invention comprises a trailer having a frame constructed of pipe sections welded together. The frame is preferably provided with a superstructure to elevate the articles being carried above the wheels, and this superstructure is also constructed of welded pipe sections. This construction provides greater strength than the trailer frames heretofore constructed, and permits simplicity of manufacture, with consequent economy in proportion to the strength provided.

A particular feature of the invention is that the frame may be constructed of the material which is to be hauled. Thus an organization whose business requires the hauling and installation of pipe, where welding of the pipe is required in the installation, may make its own trailers out of old pipe which may have outlived its usefulness for installation purposes, and yet be quite suitable for the construction of a very strong trailer frame according to the present invention.

It is therefore an object of the invention to provide a frame for the trailer of the character described, which frame is constructed entirely of welded pipe.

A more limited object of the invention is to provide a trailer frame having a superstructure, in which the superstructure as well as the frame proper are constructed of welded pipe sections.

Other objects and features of novelty inherent in the improved frame construction will be apparent as the following description proceeds, as taken in conjunction with the accompanying drawings in which:

Fig. 1 is an elevation of the trailer according to the present invention;

Fig. 2 is a plan view of the same;

Figure 3:
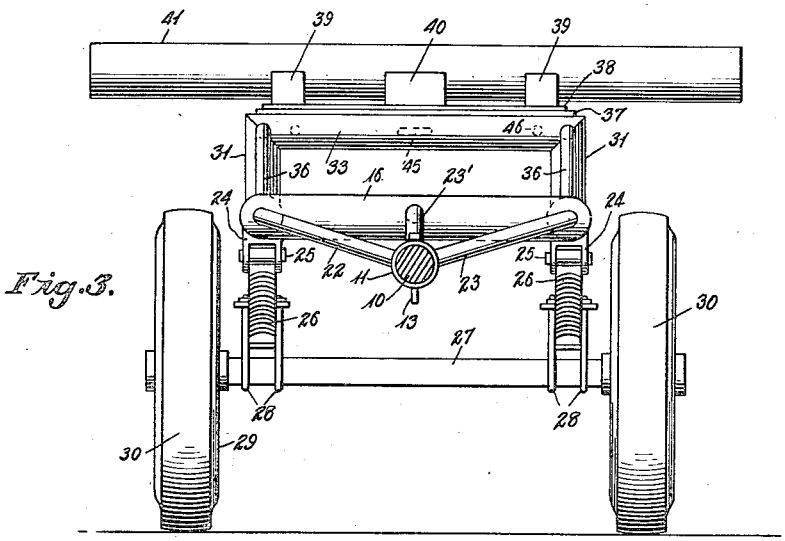
Fig. 3 is a front elevation of the structure shown in Figs. 1 and 2.
Figure 4:
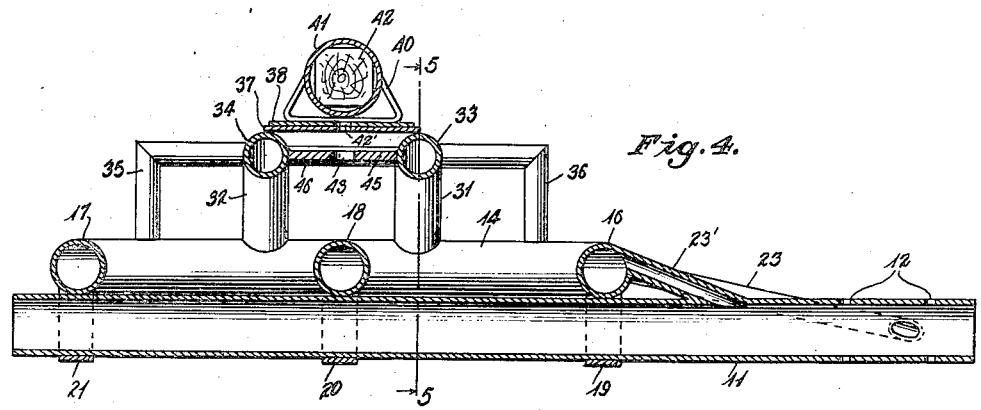
Fig. 4 is a vertical longitudinal section through the trailer frame, including the superstructure.
Figure 5:
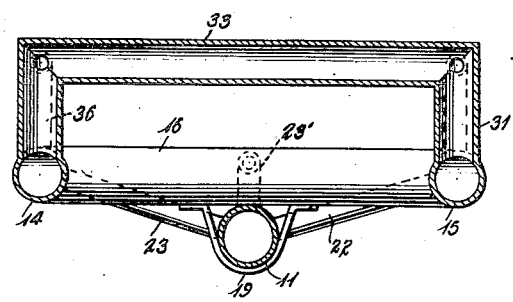
Fig. 5 is a vertical section taken along line 5—5 of Fig. 4.

Referring more particularly to the drawings for a detailed description of one embodiment of the trailer according to the present invention, the trailer is connected, and receives its tractive force, from a tractor or truck (not shown) by means of a draft pole 10. Slidably mounted upon the draft pole is a pipe section 11, which constitutes the main longitudinal member of the trailer frame. The member 11 is provided with a plurality of vertically aligned, centrally disposed holes 12, which register with corresponding holes in the draft pole 10, so as to adjustably receive a headed pin 13, by means of which the trailer may be adjusted to transport longer or shorter articles, such as pipes, poles, and the like.

Centrally disposed above the member 11 is a rectangular frame, which is horizontally disposed, and which together with the member 11 constitutes the main frame of the trailer. The rectangular frame comprises longitudinal members 14 and 15 and transverse members 16 and 17. In the embodiment shown, these are constructed of pipe sections of the same diameter, which are beveled and welded at the corner joints. A central transverse member 18 is interposed between the members 14 and 15, and the ends of the member 18 are rounded or shaped to fit the rounded surface of the pipes 14 and 15 and secured thereto by welding.

The rectangular frame just described is secured to the main longitudinal pipe member 11 by strap members 19, 20 and 21 respectively, which pass under the member 11 and are secured at both sides thereof to the respective transverse members 16, 18 and 17. These straps are welded to the main member 11 and to the transverse members. The outer portions of the frame are stayed to the central member 11 by means of divergent brace members 22 and 23, constructed of pipe 7 and respectively welded to the pipe sections 16 and 11. A similar stay or brace member 23' is interposed between the central portion of the pipe member 16 and the main pipe member 11, and welded at each end in the same manner.

Depending from each end of members 14 and 15 are a plurality of spring shackles 24. These shackles are welded in position, and carry shackle bolts 25, receiving the ends of half-elliptic springs 26 secured to the axle 27 by U-bolts 28. The axle 27 carries wheels 29 provided with solid or pneumatic tires 30. The axle, wheels and tires are conventional, and may be of any desired type.

The frame as described above will not extend far above the tires of the wheels, and in order to insure proper clearance for the wheels, as well as to permit the load to extend laterally beyond the confines of the wheels, a superstructure is provided. Extending from each of the longitudinal members 14 and 15 are a plurality of short vertical pipe sections 31 and 32, the lower ends of which are shaped to fit the rounded surface of the members 14 and 15, and welded in position. The upper ends of the corresponding pipe sections 31 and 32 are beveled and connected by bevel ended transverse pipe members 33 and 34, thus forming bevel welded corner joints. Each of the uprights 31 and 32 are braced from the longitudinals 14 and 15 by means of welded pipe braces 35 and 36.

A bunker is formed on top of the superstructure, by means of a pair of sheet metal plates 37 and 38, of the form shown in Fig. 2, corresponding edges of which are welded to the transverse superstructure members 33 and 34. A pair of end straddles 39 and a bunker straddle 40 are provided on the bunker, and comprise straps having their buckle portions welded to the upper plate, and their ends upturned as shown in Fig. 1.

The straddles 39 and 40 form seats to receive a bolster 41 which comprises a single length of pipe of a length to extend beyond the wheel tread in each direction. This pipe is filled with a wood filler 42. A vertical hole 42' is provided in the bolster to receive a king pin, the lower end of which engages a corresponding hole 43 in the bunker. A plurality of spaced holes 44 are provided in the top of the bolster to receive bolster pins (not shown). To reinforce the superstructure, a small plate 45 is positioned beneath the plate 37, and a pair of small pipe sections 46 are interposed between the respective ends of the pipe members 33 and 34.

From the foregoing description it will be apparent that the applicant has provided a very strong frame construction, which is made up entirely of pipe sections welded together. While one embodiment of the invention has been illustrated and described in great detail, the invention is not limited to any of the details shown or described, but includes such modifications and embodiments thereof as come within the scope of the appended claims.

Having thus described the invention, what I claim as new and desire to secure by Letters Patent of the United States is:

1. A trailer frame of the character described, comprising in combination, an elongated pipe section extending the full length of the frame and adapted to telescopically receive a draft pole, a horizontally disposed rectangular frame constructed entirely of pipe sections, and means for rigidly securing said frame to said pipe section, comprising a plurality of strap members passed around the pipe section and secured at their ends to the rectangular frame, and downwardly and forwardly converging braces extending from the frame to the pipe section.

2. A trailer of the character described, comprising in combination, an elongated pipe section adapted to telescopically receive a draft pole, a rectangular frame secured to said pipe section and including side and end members constructed entirely of pipe sections and welded together at their ends by beveled joints, a superstructure mounted above said frame also constructed of pipe sections welded together, a bunker mounted on said superstructure, and a bolster mounted on said bunker.

3. A trailer of the character described, comprising in combination, an elongated pipe section adapted to telescopically receive a draft pole, a rectangular frame secured to said pipe section and constructed entirely of pipe sections connected by welded beveled joints, a superstructure mounted above said frame also constructed of pipe sections connected by welded bevel joints, a bunker mounted on said superstructure, and a bolster mounted on said bunker, a plurality of forwardly converging brace members rigidly connecting said rectangular frame to said elongated pipe section, and angle brace members for supporting said superstructure from said rectangular frame, said brace members comprising pipe sections secured in place by welding.

4. A trailer of the character described comprising a main frame including a central longitudinal draft member and a rectangular portion rigidly connected to said draft member to overlie the latter, running gear beneath the main frame, a transversely extending superstructure equal in length to the width of the main frame and mounted thereupon, said superstructure including horizontal, parallel pipe sections supported at their ends by vertical pipe sections fastened to the main frame, and angular members bracing the horizontal pipe sections against movement longitudinally of the main frame; and a bunker structure mounted on the superstructure.

5. A trailer of the character described comprising a main frame including a central longitudinal draft member and a rectangular portion rigidly connected to said draft member to overlie the latter, running gear beneath the main frame, a transversely extending superstructure equal in length to the width of the main frame and mounted thereupon, said superstructure including horizontal, parallel pipe sections supported at their ends by vertical pipe sections fastened to the main frame, angular members bracing the horizontal pipe sections against movement longitudinally of the main frame and reinforcing means extending between the horizontal, parallel pipe sections; and a bunker structure supported on the superstructure.

6. A trailer of the character described comprising a main frame including a central longitudinal draft member and a rectangular portion rigidly connected to said draft member to overlie the latter, running gear beneath the main frame, a transversely extending superstructure equal in length to the width of the main frame and mounted thereupon, said superstructure including horizontal, parallel pipe sections supported at their ends by vertical pipe sections fastened to the main frame, and angular members bracing the horizontal pipe sections against movement longitudinally of the main frame; a plate secured to and resting upon the superstructure, a plurality of straddles mounted in spaced relation on the plate, and a bolster supported by the straddles.

7. A trailer of the character described comprising a main frame including a central longitudinal draft member and a rectangular portion rigidly connected to said draft member to overlie the latter, running gear beneath the main frame, a transversely extending superstructure equal in length to the width of the main frame and mounted thereupon, said superstructure including horizontal, parallel pipe sections supported at their ends by vertical pipe sections fastened to the main frame, reinforcing means extending between the horizontal, parallel pipe sections, and angular members bracing the horizontal pipe sections against movement longitudinally of the main frame; a plate secured to and resting upon the superstructure, a plurality of straddles mounted in spaced relation on the plate, and a bolster supported by the straddles and projecting at its ends laterally beyond the sides of the main frame and overlying the wheels of the running gear.

In testimony whereof I affix my signature.

BEN L. COCHRAN.